United States Patent Office 3,502,309
Patented Mar. 24, 1970

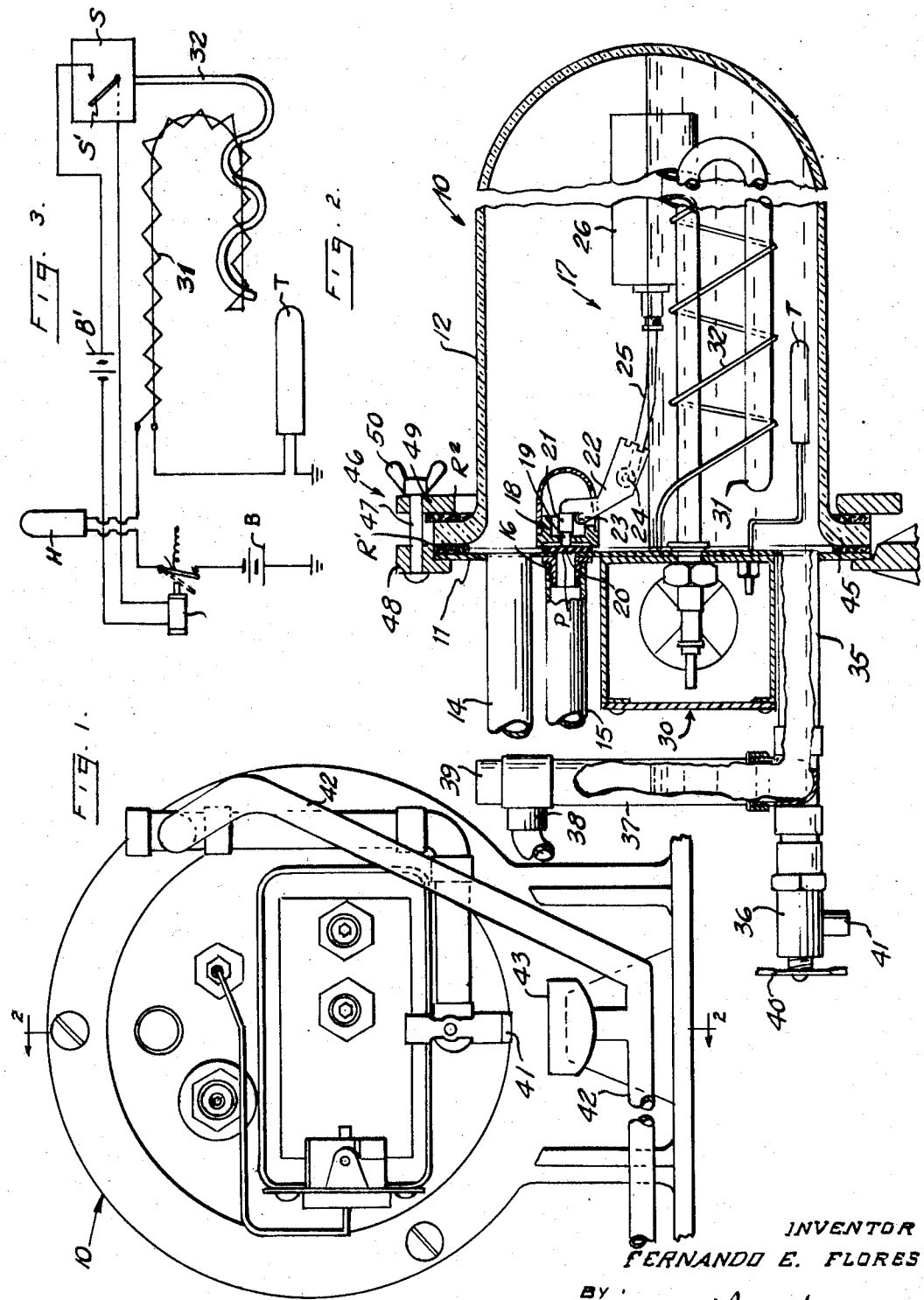

3,502,309
HUMIDIFIER
Fernando E. Flores, Parlin, N.J., assignor to Tenney
Engineering, Inc., Union, N.J.
Filed June 27, 1967, Ser. No. 649,227
Int. Cl. B01f 3/04
U.S. Cl. 261—130
2 Claims

ABSTRACT OF THE DISCLOSURE

A low pressure vapor generator for conditioning atmosphere in a test chamber in which the vapor supply to the test chamber is controlled according to the demands of the percentage of humidity desired. The device maintains and modulates a predetermined quantity of water at a desired level and is transparent for inspection and easily cleaned. The vapor generator consists of a transparent horizontally extending bell jar having an opening with an enlarged lip clamped to a vertical mounting plate by means of releasable wing nuts. A float unit including a valve and connecting arms is fixed to the mounting plate and extends horizontally into the bell jar. A heater and thermostat is submerged in the water contained in the bell jar. The thermostat controls the on and off period of the heater to maintain the water at a predetermined temperature. A vapor outlet is provided in the upper portion of the bell jar and a conduit including an external overflow pipe extends upwardly to a level with the vapor outlet. A drain valve is located at the lower portion of the bell jar downstream of the overflow pipe. The conduit connected through the mounting plate to drain the bell jar without unclamping said jar. A moisture responsive element for mounting in a test chamber for indicating a predetermined moisture content and a switch to turn on and off the heater to modulate the flow of low pressure vapor to a test chamber.

This invention relates to a humidifier and more particularly to a low pressure vapor generator for conditioning an atmosphere as in a test chamber.

Humidifiers are well known in the prior art, generally constructed to produce water vapor such as found in a low pressure steam supply, centrifuges, spray nozzles, etc. such as those used in conjunction with hot air heating systems. In this particular invention, the humidifier is designed to produce and supply low pressure vapor for the close control of humidity to a test chamber. The vapor supply to the test chamber being controlled according to the demands of the quantity of moisture desired. The device can be fully automatic, that is, a water supply is connected to a vapor generating cell and a float in said cell opens and closes an inlet valve to maintain and modulate a predetermined quantity of water at a desired level. A heating element is mounted to be immersed in the water in said cell. A capillary tube with temperature responsive fluid is wound around the heating element in said cell. Said capillary tube is connected to a switch to provide electrical energy to the heater and in turn, heat the water surrounding said heater. This switch will break the electrical circuit when heated to its preset cutout temperature should the water level in he cell be accidentally reduced exposing all or part of the heater. This setting may be slightly above the boiling point of water at atmospheric pressure. The quantity of water vapor supplied to the test chamber is controlled by the amount of heat input generated by the electric heater to establish a driving potential created by the water vapor pressure difference, upon demand of a humidity controller connected in series with said cutout switch. The temperature setting of an auxiliary thermostatic control also in series with the electrical input to the heater with its thermo element in the water may be at a preset temperature for water as a preheater to reduce time lag during long off cycles. As the water is evaporated, the mineral deposits remain as a salt residue that may coat the heater element and with other impurities may build up to an undesirable degree. To provide a visual check of this build up of the salts that are precipitated out of the water due to continuous heating and precipitation, the cell is formed of a clear glass. The glass cell is mounted to abut with a wall through which the supply and discharge lines as well as the heat supply and controls are projected. The glass cell is retained in this abutting sealed relationship by a plurality of pressure couplings that may be quickly and easily released so that the cell may be cleaned of all impurities and residue.

It is an object of this invention to provide a low pressure water vapor generator.

It is a further object of this invention to provide a constant or modulated flow of water to the vapor generator to in turn supply the demand for humidity within a test chamber.

It is a further object of this invention to provide a transparent low pressure water vapor generator to permit visual checking of the contaminating coating and residue build up produced by precipitation of the mineral salts and impurities of the water supply.

A still further object of this invention is to provide a low pressure water vapor generator in which the generator is positioned in a horizontal relationship to maintain a modulated water supply and in turn maintain a desired fluid level within the generator for maximum efficiency and in addition the horizontal attitude of the generator may be maintained for any mounting within 360°.

A still further object of this invention is to provide a low pressure water vapor generator that is not only easily checked visually for its functioning, but is also quickly and easily dismounted for cleaning and as quickly assembled for operation.

A still further object of this invention is to provide a low pressure water vapor generator that is supplied with a constant modulated flow of fresh water to provide a predetermined level of fluid and maintain a constant flow of water into said vapor generator to effect a deconcentration of the salt laden water and reduce the precipitation of the salts within the generator.

A further object of this invention is to provide means to release any overflow of fluid supplied to said water vapor generator as well as means to quickly and easily drain said generator for cleaning or malfunctioning.

Further objects of this invention shall become apparent by reference to the accompanying detailed description and the drawings in which:

FIG. 1 is a front end elevational view of the vapor generator, and

FIG. 2 is a cross sectional view taken on line 2—2 of FIG. 1.

Referring to the drawings there is illustrated a humidifier which is in fact a low pressure water vapor generator 10. A front elevational view of the device is illustrated in FIG. 1 and a cross sectional view of the device is illustrated in FIG. 2 showing the components in their connected relationship. The low pressure water vapor generator 10 is comprised of a mounting plate 11 having a bell jar or vessel 12 mounted in sealed relation against one surface of plate 11 while all of the necessary utilities and functional apparatus for this vapor cell 12 are mounted on the opposite side of plate 11 and connections are projected through plate 11. For example, a vapor outlet 14 projects through plate 11 to be connected to the vapor cell 12. A water inlet 15 is connected to plate 11 by a coupling 16, the coupling 16 providing an inlet port P that is covered and regulated by a float valve 17. The float valve comprises a mounting element 18 attached to the mounting plate 11. The mounting element 18 supports a valve 19, valve 19 having a flat valve face 20 generally of a neoprene or resilient character to provide a sealing of the inlet port P. Valve face 20 is supported on a stem 21 reciprocally mounted in mounting element 18. The end of stem 21 abuts with a pivotally mounted arm 22 pivotally supported at 23 by mounting element 18. Arm 22 is also provided with a pivot 24 retaining a pivotal arm 25. However arm 25 has a limited pivotal movement. When arm 25 is lifted, it will in turn lift the end of arm 22 providing pressure on stem 21. The end of arm 25 has a float 26 mounted thereon so that when the bell jar 12 is partially filled with water to a desired level, float 26 will be lifted as illustrated in FIG. 2 and arm 25 will in turn lift arm 22 providing pressure on stem 21 which in turn provides pressure on valve face 20 to seal the inlet port P. However when the water level in the bell jar 12 drops below a predetermined level, float 26 and arm 25 will drop. The pressure on arm 22 will be released thus releasing pressure on stem 21 and allowing the water pressure through inlet P to lift the face of valve 20 from its pressure sealing position and allow water to be metered into the bell jar to again raise the fluid level. Thus float 26 will again be lifted to close inlet P. Also mounted to the exterior of the mounting plate 11 is a junction box 30. Mounted within the junction box there is an auxiliary linear thermostat T and top limit safety device including a thermostat S and switch S' to the electrical circuit and to the heater 31 (as shown in FIG. 3). The schematic circuit shown in FIG. 3 comprises a heater 31 with a linear thermostat T and humidity probe H. The thermostat T, being connected on one side to ground and on the opposite side to the heater 31. The heater 31 being connected on its opposite side to the humidity probe H. The humidity probe H being connected on its opposite side to a normally closed switch 55. The opposite side of switch 55 being connected to a source of energy such as battery B and the battery connected on its opposite side to ground. Thus the heater is energized with a demand for heat by thermostat T and is deenergized when the thermostat reaches its pre-set temperature. The thermostat opening and closing to maintain the preset temperature. Also when the vapor is generated and flows to the vapor chamber (not shown), the humidity probe H will respond to the build up of humidity. When the humidity rises above the desired preset humidity setting of the probe H, the circuit is opened by probe H and when the humidity drops below the setting, the probe closes the circuit, thus modulating the flow of vapor. A safety limit control circuit is also provided, that is, with the capillary tube 32 wrapped around the heater in the bell jar, the tube is connected to a safety limit thermostat S. Thermostat S is provided with a switch S' that is responsive to the capillary tube 32, when an excessive temperature is picked up by capillary tube 32, the switch S' will be closed. Switch S' is connected on one side to a battery B', the battery being connected on its opposite side to a relay 56. The opposite side of switch S' being connected to relay 56 so that closing of switch S' energizes relay 56. When relay 56 is energized, it will open switch 55 which in turn opens the main circuit to the heater 31 and thus acts as a safety control when needed. Thus the heater 31 will provide the necessary heat to bring the water surrounding said heater in the bell jar to a predetermined temperature. The humidity control circuit for the heater will cut out at the preset temperature and will re-energize when the temperature drops below this preset limit. A capillary tube 32 is wrapped around heater 31 and is in turn passed through mounting panel 11 to the junction box 30 to provide the connection to the safety limit thermostat S. This circuit is designed to be fail safe and will open the circuit to the heater when its cut out temperature is reached and also when the water level fails to be maintained exposing part or all of the heater. Also connected through panel 11 is the outlet 34. Outlet 35 is connected directly to a drain valve 36 and an overflow pipe 37 is connected to the outlet 35. The overflow pipe 37 extends to a height sufficient to be on a level with the vapor outlet of the bell jar 12 so that when fluid within bell jar 12 continues to rise to an excessive level, it will also rise in the overflow pipe 37 and will drain out the overflow port 38. This insures a drainage of excess water in bell jar 12 and prevents any overflow into the outlet 14 that supplies water vapor to the desired test chamber that is being humidified. The overflow pipe 37 is also provided at its top with a vent 39. This vent provides means for equalizing any pressure build up within bell jar 12. The drain valve 36 is opened by turning element 40 to open the valve and drain through the outlet port 41. Of course port 41 can be positioned directly over a drain line 42 preferably using a level cup shaped receiving inlet 43 and outlet 38 of the overflow pipe 37 may also be connecter by line 42 for drainage. The drain valve 36 permits complete drainage of the bell jar 12. It also serves as an adjustable bleeder device when the water being utilized is found to be a hard water producing a great deal of precipitation of the minerals found in the water. By bleeding the water after it has precipitated to a degree, the water may be deconcentrated continuously allowing fresh water to be introduced thus retaining a deconcentrated solution within bell jar 12 and preventing the build up of scale and the tendency to foam in the bell jar and thus allowing the device to operate for a longer period without having to remove the bell jar for cleaning. When distilled or chemically pure water is used, this constant bleed process is not required. When the bell jar requires cleaning, it is a simple matter as the bell jar 12 is provided with a circular mounting base or lip 45. The base 45 is provided with two sealing rings R1 and R2. Base 45 is positioned upon ring R1 and pressed against mounting plate 11. A plurality of clamps 46 are provided, clamp 46 being comprised of a bolt 47 having a clamp 48 at one end and a clamp 49 at the other end, the bolt 47 passing through these clamps and the clamps being adjustable on the length of the bolt. With clamp 48 positioned against plate 11 and with seal R1 placed against base 45 and against plate 11 and clamp 49 positioned on seal R2, a wing nut 50 threadably secured on bolt 47 may be secured to provide sufficient pressure to retain the circular pipe 45 in its mounted relationship as shown in FIG. 2. It is to be noted that in the event the vapor generator 10 is to be mounted in a particular attitude with relation to other components such as the test chamber, the clamps 46 permit rotating the support to any position, that is, any angle in 360°. However in any mounting the attitude of the generator must be in a horizontal relation as shown in FIG. 2 to insure the water level being maintained as shown and the overflow being in a vertical relation as illustrated.

It is to be noted that the humidifier is designed as a low pressure water vapor generator primarily to condition an atmosphere such as required for various different size test chambers to produce a constant vapor flow according to the demand and with the desired vapor flow, there will be an escape of water as vapor. Thus the device is designed to provide a modulated flow of water into the generator that will be in proportion to the vapor escaping. And, although a drain has been designed to permit easy drainage of the generator, it is also provided in view of the fact that many of the water supplies used are ladened with mineral salts or impurities and the drain permits a means of bleeding the concentrated solution to de-concentrate the water used in the generator and give the generator greater life or at least greater periods of use without stopping for cleaning scale or impurities that are detrimental to exact control.

What is claimed is:

1. A lower pressure vapor generator for supplying moisture to an atmosphere within a test chamber which includes a vapor generating cell formed as a bell jar of transparent material to form a reservoir for the water to be vaporized, said bell jar having one circular opening at one end with an enlarged lip, said lip clamped to a mounting plate, said mounting plate support vertically and said bell jar supported horizontally, a float unit affixed to said mounting plate and extending horizontally into said reservoir, said float unit including a water inlet valve, means to connect said float unit to said water inlet valve, to open and close said valve to modulate the flow of water over the length of said bell jar, a heater in said reservoir positioned to be submerged in said water and connected to a source of potential, a thermostat also positioned in said reservoir to be submerged in said water, said thermostat preset to control the on and off period of said heater to maintain said water at a predetermined temperature to produce a desired supply of low pressure vapor, an outlet in an upper portion above the water in said reservoir and extending through said mounting plate from said vapor generating cell to supply low pressure vapor to a test chamber, a conduit means including an external overflow pipe means extending upwardly to a level with said vapor outlet and a drain valve located at the lower portion below the water in said reservoir downstream of the overflow pipe, said conduit means connected through said mounting plate to said reservoir to drain said reservoir without unclamping said bell jar, a moisture responsive element adapted to be mounted in the test chamber to indicate a predetermined moisture content and means to turn on and off said heater to modulate the flow of low pressure vapor to the test chamber.

2. In a low pressure vapor generator according to claim 1 on which there are a plurality of clamps comprised of releasable wing nuts about the lip of said bell jar to mount said bell jar horizontally on one side of a mounting plate and in which said bell jar may be removed by releasing said wing nuts.

References Cited

UNITED STATES PATENTS

| | | | |
|---|---|---|---|
| 1,847,255 | 3/1932 | Myers | 137—439 X |
| 1,862,089 | 6/1932 | Kantor | 261—27 |
| 2,517,666 | 8/1950 | Hood | 55—257 |
| 2,094,456 | 9/1937 | Lattner | 261—92 |
| 2,236,359 | 3/1941 | Armstrong | 261—142 X |
| 2,473,669 | 6/1949 | White | 285—368 X |
| 2,810,381 | 10/1957 | Knight | 219—272 X |
| 3,170,607 | 2/1965 | Anthon | 285—368 X |
| 3,187,161 | 6/1965 | Finn | 219—331 |

RONALD R. WEAVER, Primary Examiner

U.S. Cl. X.R.

219—272, 362; 261—70, 142